United States Patent [19]

Motruk

[11] Patent Number: 4,541,492
[45] Date of Patent: Sep. 17, 1985

[54] EARTH-WORKING TOOL HEAD

[75] Inventor: John Motruk, Whittier, Calif.

[73] Assignee: Hawaiian Motor Company, Long Beach, Calif.

[21] Appl. No.: 436,881

[22] Filed: Oct. 26, 1982

[51] Int. Cl.$^4$ ............................................ A01B 35/00
[52] U.S. Cl. ...................................... 172/41; 172/40; 74/48
[58] Field of Search ................... 172/40, 41, 376, 377, 172/42, 43, 118; 74/48

[56] References Cited

U.S. PATENT DOCUMENTS

| | | | |
|---|---|---|---|
| 718,571 | 1/1903 | Hoodless | 172/376 |
| 1,827,074 | 10/1931 | Ditlevsen | 172/41 |
| 3,204,704 | 9/1965 | Goette | 172/41 |
| 3,710,870 | 1/1973 | Pfeiffer | 172/41 X |
| 3,935,905 | 2/1976 | Chery | 172/41 X |
| 4,305,470 | 12/1981 | Anderson | 172/41 |
| 4,351,396 | 9/1982 | Moulton | 172/41 X |
| 4,364,435 | 12/1982 | Tuggle et al. | 172/41 X |
| 4,452,316 | 6/1984 | Edwards | 172/41 |

FOREIGN PATENT DOCUMENTS

| | | |
|---|---|---|
| 607063 | 8/1948 | United Kingdom . |
| 800090 | 8/1958 | United Kingdom . |
| 828722 | 2/1960 | United Kingdom . |

*Primary Examiner*—Richard J. Johnson
*Attorney, Agent, or Firm*—Nilsson, Robbins, Dalgarn, Berliner, Carson & Wurst

[57] ABSTRACT

A head for a powered earth-working tool is adapted to be driven by a rotating shaft which is driven by the prime mover of the tool. The head includes a housing having an opening for the shaft; a driver gear in the housing fixed to the shaft which rotates with the shaft about an axis; an axle in the housing disposed perpendicularly to such axis of rotation and carrying a driven gear on a portion of the axle away from the ends to mesh with the driver gear and rotate the axle; a pair of pins, offset from the axis of the axle, mounted to move with the rotation of the axle, 180° out of phase with each other; a pair of spindles in the housing disposed substantially parallel to the axle; a pair of connecting rods each having an opening to receive one of the pins and being mounted to swing from one of the spindles about the axis of the spindle; and a pair of earth-working members each fixed to one of the connecting rods to swing from the associated spindle about the axis of the spindle in a pendulum-like oscillation 180° out of phase with the other member. The head has wheels for rolling support; also, a roller is adapted to fit over such wheels to provide an alternative form of rolling support. The members can take particular alternative forms for hoeing, digging trenches or cutting and lifting sod.

32 Claims, 10 Drawing Figures

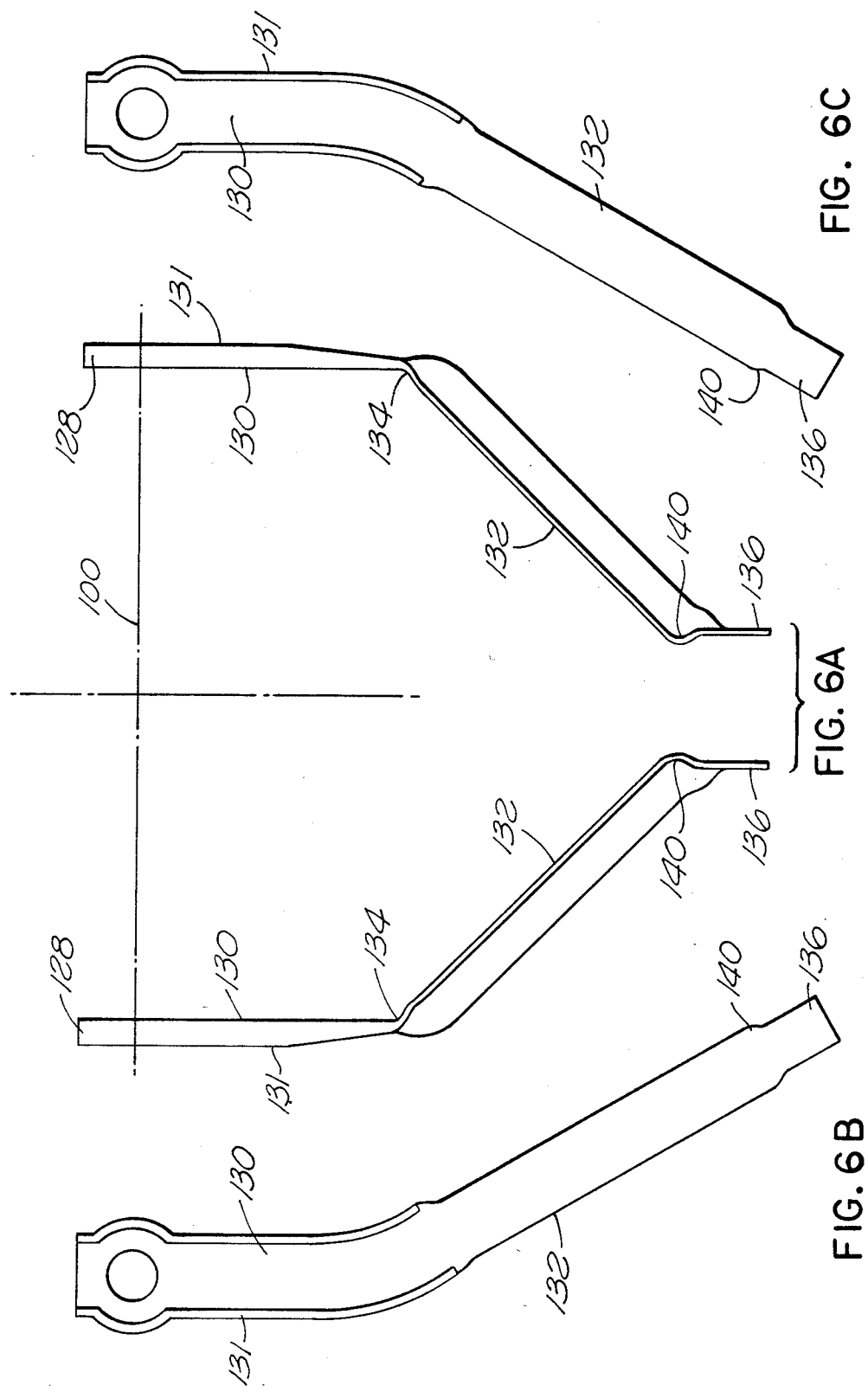

EARTH-WORKING TOOL HEAD

FIELD OF THE INVENTION

The field of the invention pertains to powered earth-working tools and, more particularly, to working heads for such tools.

BACKGROUND OF THE INVENTION

The development of relatively small-scale earth-working tools has been the subject of great thought and effort over the years in view of the widespread need for convenient, workable tools of that sort.

Moulton, U.S. Pat. No. 4,351,396, Sept. 28, 1982, is directed to the basic form and mechanics of a type of power hoe head which is known and which has been found to be attractive. That basic form incorporates into the head a motor, an axle which is parallel to the shaft of the motor, a pair of hoeing tines each extending first generally downwardly from the vicinity of the housing, then generally downwardly and inwardly, and then generally upwardly and inwardly. A motor shaft gear is opposite an end portion of the axle which end portion carries a gear for rotating the axle which meshes with the shaft gear. The two hoeing tines move 180° out of phase with each other, in pendulum-like oscillation from two rotatable spindles. Chery, U.S. Pat. No. 3,935,905, Feb. 3, 1976, discloses a head which is comparable to the head in Moulton in some respects, but clearly distinct in other important respects. In Chery, the hoeing action is accomplished by a U-shaped cutting blade carrying front and back cutting edges therealong, which moves forward and backward.

Pfeiffer, U.S. Pat. No. 3,710,870, Jan. 16, 1973, incorporates prong-like tines configured in a generally horizontal plan and a gear-train arrangement from a motor in a similarly horizontal plan from the back of the tiller toward the front. The tiller is adapted for use on one's hands and knees. Brooks, U.S. Pat. No. 2,816,495, Dec. 17, 1957, incorporates a somewhat comparable gear-train in a mechanism which hoes using twirling prong-like implements. Ditlevsen, U.S. Pat. No. 1,827,074, Oct. 13, 1931, in a tool having a rather traditional hoeing implement, incorporates another gear arrangement employing gears at angles to one another.

Burke, Great Britain, Pat. No. 653,985, published May 30, 1951, incorporates legs, which move 180° out of phase with one another carrying cutting blades. The apparatus is rather large and complex and is moved on wheels.

A number of other patents are exemplary of the variety of forms of implements for cultivating or otherwise interacting with the earth which have been attempted and of the search for such forms which are convenient and workable: Bolongaro, U.S. Pat. No. 2,550,522, Apr. 24, 1951, Richardson U.S. Pat. No. 3,548,953, Dec. 22, 1970, Kelsey, U.S. Pat. No. 2,779,259, Jan. 29, 1957, Foster et al., U.S. Pat. No. 4,003,436, Jan. 18, 1977, and Bills, U.S. Pat. No. 3,756,324, Sept. 4, 1973. Bolongaro and Bills, also with other of the initially referenced patents as noted, are exemplary of the types of forms of earth-working tools which have traditionally employed wheels.

Also, in a somewhat more general context, powered trench digging is typically accomplished by, for example, large, heavy duty apparatus incorporating a blade which rotates into the earth or apparatus incorporating a multi-sided digger to trap the soil therebetween. Similarly, powered sod cutting is typically carried out by, for example, large apparatus on wheels which incorporates a blade which reciprocates under a strip of sod to cut the strip.

The present invention, in a powered earth-working tool head, provides highly advantageous linkage between an earth-working member which undergoes a pendulum-like oscillation in accomplishing such working, and a prime mover which is distant from the immediate vicinity of the head. It also advantageously incorporates a wheel-roller arrangement in a head of that type. The invention, in a head incorporating the pendulum-like oscillation and the related mechanism to accomplish such oscillation, further provides particular specific, advantageous forms for trench-digging members and sod cutting and raising members.

SUMMARY OF THE INVENTION

In accordance with the invention, a head for a powered earth-working tool having a prime mover for rotating a shaft for driving the head, includes: a housing having an opening to receive the shaft; a driver gear in the housing fixed to the shaft for rotation with the shaft about an axis; an axle in the housing angularly disposed with respect to the axis of rotation of the driver gear; a driven gear in the housing fixed to the axle to mesh with the driver gear and rotate the axle; a pin mounted to move with the rotation of the axle, the pin being offset from the axis of the axle; a spindle in the housing disposed substantially parallel to the axle; a connecting rod having an opening to receive the pin and mounted to swing from the spindle with the movement of the pin; and an earth-working member fixed to the connecting rod to swing from the spindle in a pendulum-like oscillation.

The axle may be substantially perpendicularly disposed with respect to the axis of rotation of the driver gear; the driver gear may be disposed opposite substantially the center portion of the axle; the driven gear may be fixed at a location away from the ends of the axle; also, the spindle may be mounted to be non-rotatable.

The head may incorporate wheels to provide rolling support; it may incorporate a roller to provide rolling support; or it may incorporate wheels with a roller to fit over the wheels to provide rolling support.

In accordance with other aspects of the invention, a head for a powered earth-working tool having a prime mover for rotating a shaft for driving the head includes: a housing as initially described; a spindle mounted in the housing; an elongated earth-working member mounted to swing from the spindle for trenching; and linkage means in the housing operatively connected to the shaft and to the member to swing the member in a pendulum-like oscillation from the spindle; wherein the member for trenching has a first elongated portion extending from the vicinity of the housing and a second elongated portion angularly disposed with respect to the first portion and having a twisted orientation with respect to the first portion.

In accordance with other more detailed features, the second portion of the member has an orientation which is twisted greater than or equal to approximately 17° and less than or equal to approximately 23°, for example, 20°, with respect to the first portion.

In accordance with yet other more detailed features, the earth-working member for trenching further includes a third portion angularly disposed with respect to the second portion and having a twisted orientation with respect to the second portion.

In accordance with still other more detailed features of the head incorporating the trenching member as initially described, the member further includes: a third portion angularly disposed with respect to the second portion and having a twisted orientation with respect to the second portion; wherein the angles of said second to said first portion and of said third to said second portion are in opposite directions; and wherein said twisted orientations of said second with respect to said first portion and of said third with respect to said second portion are in opposite directions.

In accordance with yet other aspects of the invention, a head for a powered earth-working tool having a prime mover for rotating a shaft for driving the head, includes: a housing having an opening for receiving the shaft; spindle means mounted in the housing; first and second elongated earth-working members mounted to swing from the spindle means for sod cutting and lifting, wherein each of the members has a first elongated portion extending from the vicinity of the housing and a second elongated portion extending inwardly substantially perpendicularly to the first portion; and linkage means in the housing operatively connected to the shaft and to such members to swing each of the members in a pendulum-like oscillation from the spindle means.

In accordance with more detailed features, the linkage means is operatively connected to swing each of the members in a pendulum-like oscillation from the spindle means substantially 180° out of phase with the other member.

BRIEF DESCRIPTION OF THE DRAWINGS

FIG. 6A is an elevational view showing other, alternative trenching members for the head of FIG. 1 as they would appear on the head of FIG. 1 looking downwardly and rearwardly; and FIGS. 6B and 6C show side elevational views of such members.

DETAILED DESCRIPTION

Figure 1:
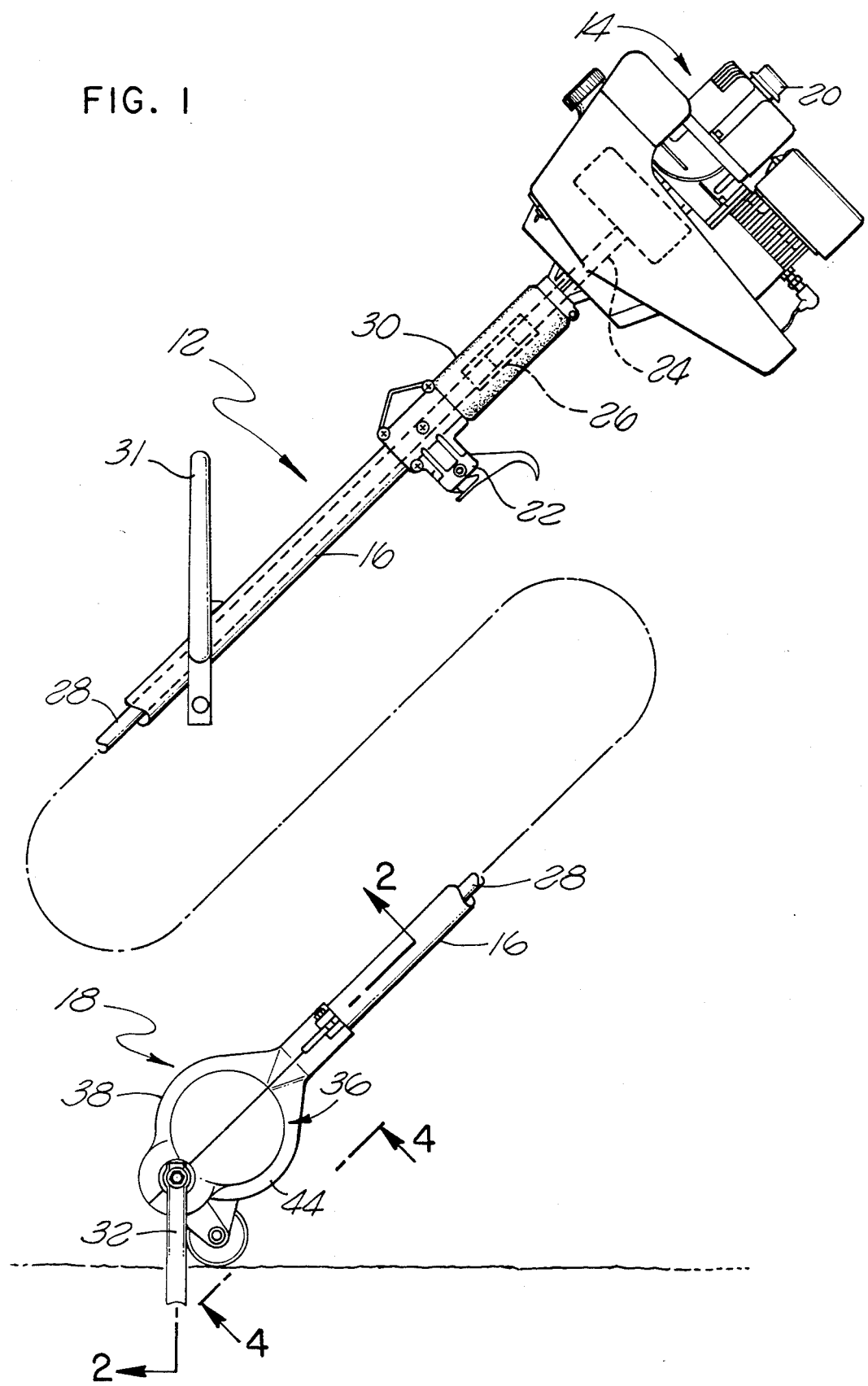
FIG. 1 is an elevational view showing a powered earth-working tool in accordance with the invention.

FIG. 1 shows an earth-working tool 12 having earth-working members (implements) which work the earth by oscillating in pendulum-like fashion, in its typical position during operation. The internal mechanism of the working head can be seen in FIGS. 2 and 3. A wheel-roller arrangement is incorporated into the head, as can be seen in FIG. 4.

Figure 2:
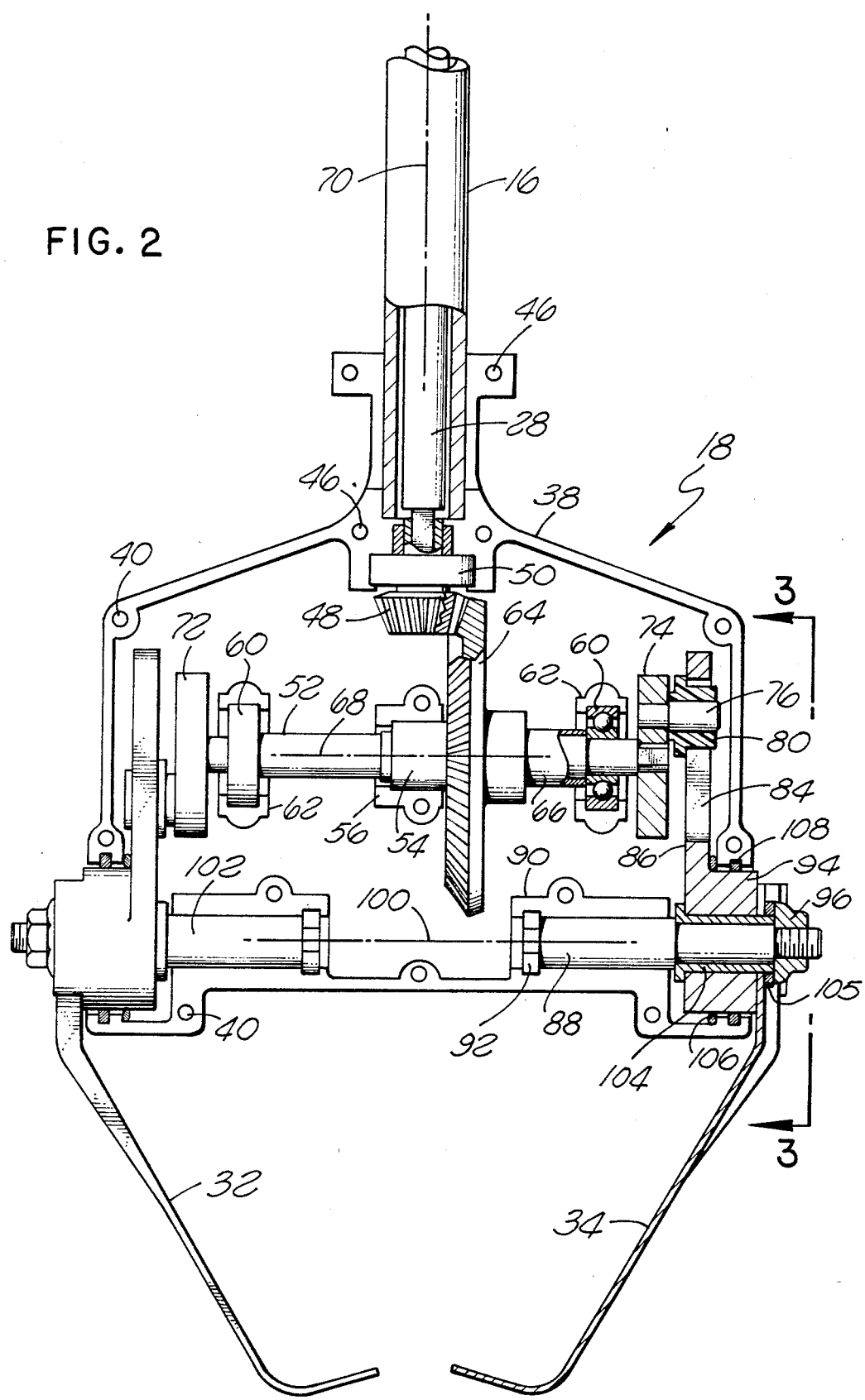
FIG. 2 is an elevational view, partially in section, showing the working head of the tool of FIG. 1, taken generally along the line 2—2 of FIG. 1, from behind and below the head in FIG. 1, with the lower half of the head's housing removed.
Figure 3:
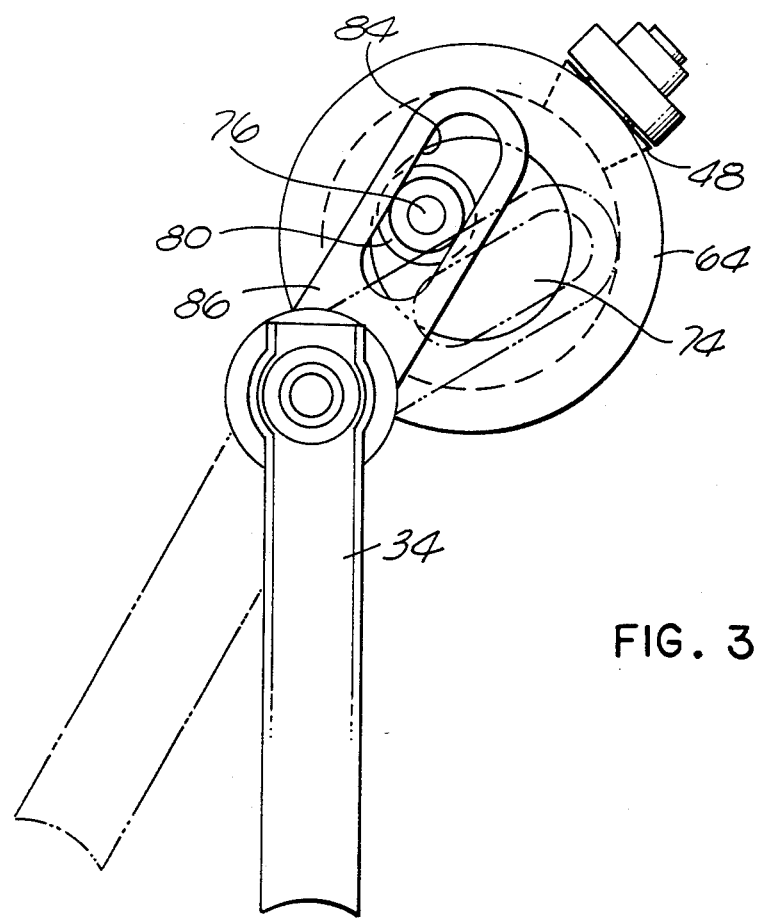
FIG. 3 is an elevational view, with parts removed for clarity, taken along the line 3—3 of FIG. 2.
Figure 4:
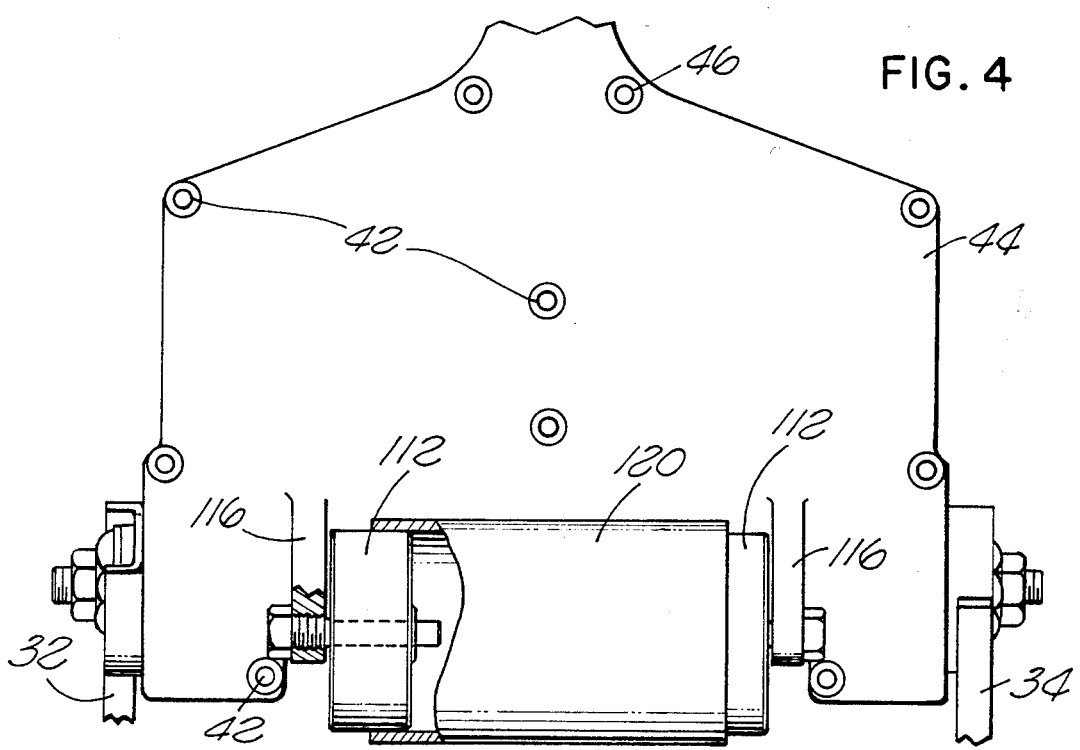
FIG. 4 is an elevational view, partially in section, taken along the line 4—4 of FIG. 1, showing the head of the tool of FIG. 1, from below and behind the head.

In FIGS. 1-3, the head is fitted with members of a type which are adapted for use as hoeing tines. Alternative earth-working members are shown in FIGS. 5A-5C and 6A-6C. Such members can replace the hoeing members of FIGS. 1-3.

Figures 5A, 5B, 5C:
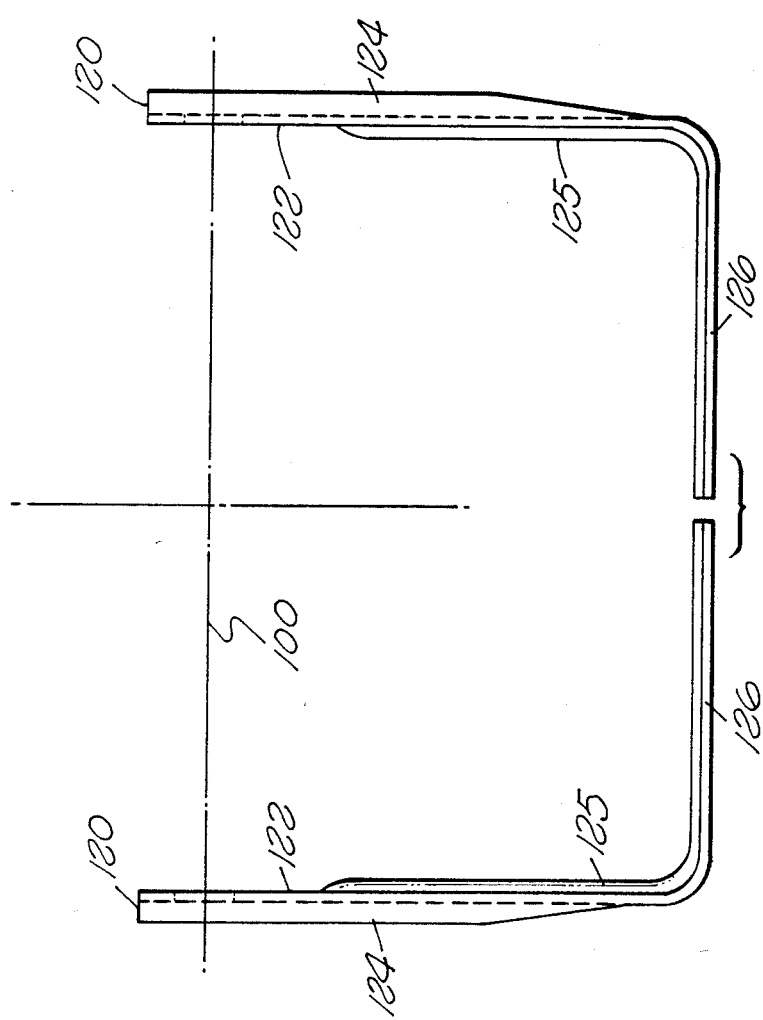
FIG. 5A is an elevational view showing alternative sod cutting and lifting members for the head of FIG. 1 as they would appear on the head of FIG. 1 looking downwardly and rearwardly.
FIGS. 5B and 5C are side elevational views of such members.

Members adapted for use in sod cutting and lifting, in FIGS. 5A-5C, incorporate an elongated cutting and lifting portion for the member which extends substantially perpendicularly to another mounting portion which extends from the vicinity of the housing of the head (and which can also contribute to the cutting). The two members, in accordance with the operation of the head when fitted with the hoeing members, oscillate 180° out of phase with each other in operation.

Members adapted to dig a trench, for example, for a sprinkler system, for water drainage or for other purposes, as shown in FIGS. 6A-6C, each incorporate a mounting portion extending from the vicinity of the housing of the head, a trenching portion angularly disposed with respect to the mounting portion and having a twisted orientation with respect to the mounting portion, and a starter portion angularly disposed with respect to the trenching portion and having a twisted orientation with respect to the trenching portion. The starter portion is particularly adapted to break into the earth during the trenching and the trenching portion is particularly adapted to provide an appropriate trench configuration.

Now turning to the earth-working tool, and in particular to the earth-working head, in more detail, and referring to FIG. 1, the tool 12 includes a conventional gasoline engine and its housing 14 mounted at the upper end of a tube 16, and an earth-working head 18 mounted at the lower head of the tube.

The engine, in conventional fashion, has an on-off switch (not shown), a choke control 20 and a throttle 22. The crankshaft 24 for the engine is shown (in phantom) somewhat schematically in FIG. 1, along with a connector 26 to fix to the crankshaft an engine-to-head tool shaft 28 which is disposed in the tube 16. A soft gripping material 30, for one hand of the operator of the tool, is disposed above the throttle on the tube, and a handle 31 having a ring-like shape, for the other hand of the user, is mounted farther down the tube.

The head 18, in FIG. 1, and as shown in FIG. 2, has (from below and behind with its lower cover removed) a left 32 and a right 34 hoeing tine. The two tines are essentially identical and, under the control of the mechanism of the head, they oscillate 180° out of phase with each in pendulum-like fashion, to accomplish their hoeing function.

In typical operation, the tube 16 of the tool 12 is held at an angle in the range of 30° with respect to the earth (depending somewhat on the height of the operator) and the head provides for oscillation of the tines between an angle of about 6° below the direction of the tube to an angle of about 52° below the direction of the tube. A typical rate of maximum oscillation during hoeing of soil of average difficulty is in the range of 1,500 cycles per minute, with a typical maximum free (non-hoeing) rate of oscillation of in the range of 1,900 cycles per minute. Variations, of course, can be conventionally accomplished in accordance with varying requirements. The tool itself is typically moved back and forth by the operator during such oscillation; however, it can also be operated by simply moving it in either direction—i.e., either backward or forward. The head 18 has a housing 36 which is conveniently and advantageously made of aluminum.

FIG. 2 shows the internal mechanism of the head inside the upper half 38 of the head housing (from below and behind with reference to FIG. 1). The upper half 38, as shown, has threaded holes 40 therealong which mate with unthreaded holes 42 of the lower half 44 of the housing (FIG. 4). On and near the neck portion of the housing the holes 46 in both halves are unthreaded for bolting the halves together.

Apart from these differences (and a difference relating to flattened portions of cradles for spindles in the head which will be referred to subsequently), the halves of the housing, as viewed looking into them (as in FIG. 2) are essentially mirror images of each other. Further, the basic outside shapes of the two halves of the housing are essentially the same.

Now referring in more detail to FIG. 2, the tube 16 of the tool passes into the neck of the housing. Similarly, the tool shaft 28, within the tube, passes into the neck of the housing. A pinion, bevel gear 48 is fixed to the tool shaft 28 in a conventional bearing connection 50. The pinion, bevel gear 48 is opposite the center portion of an axle 52. A central bearing 54, fixed to the axle, rotates with the axle in a central bearing cradle 56 which rises from the wall of the housing. The axle, also, rotates within two conventional outside bearings 60 which are fixedly mounted in two outside bearing cradles 62 which, in similar fashion to the central bearing cradle, rise from the wall of the housing.

A larger bevel gear 64, fixed to the axle 52, to mesh with the pinion, bevel gear 48, rotates the axle 52. A spacer 66, rotatable about the axle, is used to properly space the axle gear 64 from the right, outside one of the two outside bearings 62.

As is apparent by reference to FIG. 2, the axle 52, with its axis 68, is angularly disposed with respect to the axis of rotation 70 of the pinion, bevel gear 48. As is also apparent, the axle is formed to have varying diameters therealong to accommodate the various parts associated with it.

A left disc element 72 (with reference to the view of FIG. 2) and a right disc element 74 are fixedly mounted at the two respective ends of the axle 52. The right disc element 74 has a pin 76 fixed thereto and a floating bushing 80, free to float on the pin, is disposed on the pin. As shown, the pin is offset on the disc from the axis 68 of the axle. The left disc element also has such a pin (not shown) and such a floating bearing 82, similar axially offset. However, the pins on the two sides are positioned on their discs to move 180° out of phase with each other with the rotation of the axle 52.

The parts on the right and left sides (with referenced to FIG. 2) driven by the right and left axially offset pins and their two floating bushings 80 and 82, are essentially identical. Therefore, focusing on the right side and on FIGS. 2 and 3, the right floating bushing 80 and the right pin 76, are received by and ride in a slot 84 in a right connecting rod 86. The connecting rod is mounted on a right spindle 88. The spindle rests in a right spindle cradle 90. The spindle is mounted to be non-rotatable. It has a thickened inner end 92 having (with reference to FIG. 2) an underside which is flattened and which rests against a flattened portion of the cradle for the spindle.

The connecting rod 86 is integrally formed with a carrier 94 for the earth-working member or implement—here the tine 34. The tine 34, in turn, is fixedly attached to the implement carrier with a flanged nut 96 which is screwed onto the right end of the right spindle 88. The right connecting rod 86 and the right tine 34, thus, with the movement of the right pin 76, swing in a pendulum-like oscillation from the right spindle about the axis 100 of the spindle (the same axis as for the left spindle 102). The right connecting rod 86 and the right tine 34 rotate back and forth about the spindle with a bearing 104 and a bearing washer 105 which rotate on the spindle, the bearing between the rod and spindle. A rubber O-ring 106 and a gasket 108 are used in sealing the housing when the two halves are put together. The two halves of the housing 38 and 44 fit together tightly and the housing is sealed tightly. This, at least in part, is required because the cavity of the housing is filled with oil or grease to provide smooth operation and durability of the head 36. The housing, thus, is made to be filled with a lubricant and sealed.

As indicated, the left connecting rod 110, the left tine 32, and the parts associated therewith at the lower left of FIG. 2 are essentially identical to the corresponding parts just described at the right. Of course, however, as indicated, due to the differing position of the left pin with the left floating bushing 82 thereon, the left tine 32, will oscillate (along with its connecting rod) 180° out of phase with the right tine 34.

Now referring to FIG. 4, the lower half 44 of the housing 36 of the head 28 (FIG. 1) has a pair of wheels 112 mounted thereon. They are conventionally mounted on a pair of brackets 116 which are integrally formed as part of the housing. Further, the wheels are press-fit into a tube 120 which acts as a roller to provide rolling support for the tool as the tool is moved by the operator. Alternatively, the wheels can be detached, removed from the tube and re-attached to provide rolling support for the tool directly on the wheels. The wheels and tube may conveniently be made of plastic material. With the roller, the screws for the wheels are held in place with mating threads along the brackets and screws. With the wheels alone, the screws and wheels are held in place by such threads and by nuts to the inside of the wheels on such screws (not present in FIG. 4).

Now, turning to FIG. 5A, two sod cutting and lifting members which may be substituted for the hoeing tines 32 and 34 are shown. They are directly substitutable for the hoeing tines by removing the flange nuts which hold the tines in position, substituting the sod cutting and lifting members, and replacing the flanged nuts. The members are shown with respect to the axis 100 of the spindles 88 and 100 so as to indicate their position when in place. The two members 120 are essentially identical. They are each formed from an elongated piece of material. Each has an elongated mounting portion 122 (see also FIGS. 5B and 5C) having outwardly raised flanges 124 which, in a fashion similar to the hoeing tines, are employed in mounting the members on the implement carriers (the right carrier 94 and the essentially identical left carrier). As shown in FIG. 5A, along the lower part of the mounting portion the area between the flanges has a curved cross section, as indicated at 125.

Each member also has an elongated sod cutting and lifting portion 126 oriented substantially perpendicularly to its related mounting portion 122. The cross sections of these portions are curved with essentially the same curvature as applies to the lower parts of the mounting portions. Such curvature is apparent in FIG. 5A and indicated at 127 in FIGS. 5B and 5C. The curvature here and along the lower parts of the mounting portions is to aid in the cutting and lifting action of the members. In this regard a radius of curvature of about 1.15 inches has been found to provide good results. This, however, can readily be varied. It will also be apparent that the flanges 124 of the mounting portions can be readily terminated at a higher point along the portions and the curvature can also be terminated at a lower point, as desired.

Now turning to FIGS. 6A–6C, they, in comparable fashion to FIGS. 5A–5C, show two earth-working members 128 which are particularly adapted for digging trenches when substituted for the hoeing tines 32 and 34. In this case, it will be evident that, although the two members are not identical, they are essentially the mirror images of one another.

Each such trenching member 128 has an elongated mounting portion 130 which, with the member in position, extends from the vicinity of the housing. In a fashion similar to the hoeing tines and to the members adapted for sod activity, the elongated mounting portion of each member includes outwardly raised flanges 131 for mounting purposes. As also indicated, as with the tines and the members adapted for sod activity, each is formed from a single elongated piece of material. The mounting portions, between the flange areas are, as shown, substantially flat.

Each trenching member 128, between its mounting portion 130 and a substantially flat trenching portion 132, has an upper transition portion 134. The view of FIG. 6A, as opposed to the view of the hoeing tines in FIG. 2, looks downward and rearward from above and in front of the head 18 in FIG. 1. From this perspective, each upper transition portion is formed by bending the member inwardly approximately 45° with respect to the mounting portion 130 and then twisting the member rearwardly approximately 20° with respect to the mounting portion. Therefore, as a result of such bending and twisting, each trenching portion is bent inwardly at an angle of approximately 45° with respect to its mounting portion and has an orientation which is twisted approximately 20° rearwardly with respect to its mounting portion. This twisting angle for the elongated trenching portion with respect to the elongated mounting portion has been found to provide good results. Such an angle which is greater than or equal to approximately 17° and less than or equal to approximately 23° should provide somewhat reasonable results.

Each trenching member 128 also includes an essentially flat starter portion 136. Further, between the trenching portion 132 and the starter portion is a lower transition portion 140. This lower transition portion reverses the bend and twist of the upper transition portion 134 of the member. Therefore, it contains an outward bend of approximately 45° and a forward twist of approximately 20°. Therefore, each starter portion is angularly disposed at approximately 45° with respect to its associated trenching portion and has an orientation which is twisted forwardly approximately 20° with respect to its associated trenching portion. The twist angle range applicable to the trenching portion, of course, also applies in corresponding fashion here.

Summarizing with respect to the sod cutting and lifting members 120 and with respect to the trenching members 128, the head 18 incorporating the pendulum-like oscillations for its members (180° out of phase) also can be advantageously applied in sod cutting and lifting and in trenching with the forms of members as shown and described.

As indicated, in the earth-working tool head 18 shown, the cavity of the head is filled with oil or grease to provide for smooth operation and durability. In addition, the gears 48 and 64 are preferably made of powdered metal that is sintered or machined steel, and the spindles 88 and 102 and the axle 52 are preferably made of a heat-treated steel. In addition, for good performance and durability, the floating bushings 80 and 82 can, e.g., be made of material sold under the name Nylotron by Polymer Corporation. In addition, although a number of conventional engines could be exployed, a 1.3 horsepower engine sold as Model 3000SS by Zenoah (one cylinder) having a centrifugal clutch or a one horsepower motor sold as Model 2500 by Zenoah (one cylinder) also having a centrifugal clutch are convenient and satisfactory. A stiff shaft (as opposed to a flexible shaft) is also conveniently used.

The earth-working tool 28, although relatively small scale, also is a relatively heavy duty apparatus. Straightforward and readily understood variations can be implemented to provide, for example, a less heavy-duty apparatus. For example, in such a less heavy-duty apparatus, weight, balance and operational requirements can be well satisfied using a head housing which has an upper half made of a plastic material and a lower half made of aluminum, having one or more compartments filled with a lubricant, such as grease, for the gear train, the axle and the area where the rollers and floating bushings interact with the connecting rods, and which does not have wheels or a roller associated therewith. Further, the earth-working members and the connecting rods can be fixed to rotatable spindles which move with the rods and members on bearings, and a flexible shaft is conveniently used. In addition, although a variety of conventional engines could be used, an engine (one cylinder) sold by Piston Power Products as Model 2300, having one horsepower, is particularly satisfactory.

In addition, with either the relatively heavy duty apparatus or less heavy duty apparatus, it is possible that the pins which control the phase relationship between the two earth-working implements could be positioned to be in phase and to drive such implements in phase, rather than 180° out of phase.

As indicated, it should be evident that many changes and modifications can be made in the embodiments which have been shown and described without departing from the spirit or scope of the invention.

What is claimed is:

1. A powered earth-working tool for operation by a standing operator, comprising:
   a prime mover;
   an elongated shaft operatively connected to said prime mover for rotation by said prime mover;
   a housing having an opening for receiving said shaft;
   at least one gripping member positioned between said prime mover and said housing at a level for grasping by the standing operator;
   a driver gear in said housing fixed to said shaft for rotation with said shaft about an axis;
   an axle in said housing angularly disposed with respect to said axis of rotation of said driver gear;
   a driven gear in said housing fixed to said axle to mesh with said driver gear and rotate said axle;
   a pin mounted to move with said rotation of said axle, offset from the axis of said axle;
   a spindle in said housing disposed substantially parallel to said axle;
   a connecting rod having an opening to receive said pin and being mounted to swing from said spindle with said movement of said pin; and an earth-working member fixed to said connecting rod to swing from said spindle in a pendulum-like oscillation.

2. An earth-working tool as defined in claim 1 wherein said axle is substantially perpendicularly disposed with respect to said axis of rotation of said driver gear.

3. An earth-working tool as defined in claim 1 wherein said driver gear is disposed opposite substantially the center portion of said axle.

4. An earth-working tool as defined in claim 1 wherein said driven gear is fixed away from the ends of said axle.

5. An earth-working tool as defined in claim 1 wherein said spindle is mounted to be non-rotatable.

6. An earth-working tool as defined in claim 5 wherein said earth-working member is fixed to a said connecting rod to swing from said spindle about an axis of rotation.

7. An earth-working tool as defined in claim 1 further comprising rolling means mounted on said housing to provide rolling support for the tool.

8. An earth-working tool as defined in claim 1 further comprising a roller mounted on said housing to provide rolling support for the tool.

9. An earth-working tool as defined in claim 1 further comprising wheels mounted on said housing to provide rolling support for said housing.

10. An earth-working tool as defined in claim 1 further comprising a second gripping member positioned between said prime mover and said housing at a level for grasping by the standing operator.

11. An earth-working tool as defined in claim 1 wherein said earth-working member is fixed to said connecting rod to swing from said spindle about an axis of rotation.

12. A head for a powered earth-working tool having a prime mover for rotating a shaft for driving the head, comprising:
a housing having an opening for receiving the shaft;
spindle means mounted in said housing;
first and second separate elongated earth-working members mounted to swing from said spindle means for trenching, each having a first elongated portion extending from the vicinity of said housing and a second elongated portion angularly disposed with respect to said first portion and having a twisted orientation with respect to said first portion; and
linkage means in said housing operatively connected to the shaft and to said members to swing said first and second members in a pendulum-like oscillation from said spindle means out of phase with one another.

13. An earth-working tool head as defined in claim 12 wherein each of said earth-working members further includes a third portion angularly disposed with respect to said second portion and having a twisted orientation with respect to said second portion.

14. An earth-working tool head as defined in claim 12 wherein each of said earth-working members further includes:
a third portion angularly disposed with respect to said second portion and having a twisted orientation with respect to said second portion;
a fourth portion having a bend and a twist therealong between said first and second portions; and
a fifth portion having a bend and a twist therealong between said second and third portions.

15. An earth-working tool head as defined in claim 12 wherein said second portion of each of said members has an orientation which is twisted greater than or equal to approximately 17° and less than or equal to approximately 23° with respect to said first portion.

16. An earth-working tool head as defined in claim 15 wherein said second portion of each of said members has an orientation which is twisted approximately 20° with respect to said first portion.

17. An earth-working tool head as defined in claim 16 wherein said second portion of each of said members is angularly disposed at an angle of approximately 45° with respect to said first portion.

18. An earth-working tool head as defined in claim 12 wherein:
each of said earth-working members further includes a third portion angularly disposed with respect to said second portion and having a twisted orientation with respect to said second portion;
said angles of said second to said first portion and of said third to said second portion are in opposite directions; and
said twisted orientations of said second with respect to said first portion and of said third with respect to said second portion are in opposite directions.

19. An earth-working tool head as defined in claim 9 wherein said linkage means is operatively connected to swing said first and second members in a pendulum-like oscillation from said spindle means substantially 180° out of phase with one another.

20. A head for a powered earth-working tool having a prime mover for rotating a shaft for driving the head, comprising:
a housing having an opening for receiving the shaft;
spindle means mounted in said housing;
first and second elongated earth-working members mounted to swing from said spindle means for sod cutting and lifting, each having a first elongated portion extending from the vicinity of said housing and a second elongated portion extending inwardly substantially perpendicularly to said first portion and substantially parallel to said spindle means, said inwardly extending portions being separated at their inner ends; and
linkage means in said housing operatively connected to the shaft and to said members to swing each of said members in a pendulum-like oscillation from said spindle means.

21. An earth-working tool head as defined in claim 20 wherein said linkage means is operatively connected to swing said first and second members in a pendulum-like oscillation from said spindle means substantially 180° out of phase with one another.

22. An earth-working tool head as defined in claim 21 wherein said spindle means includes first and second spindles, said first member being mounted to swing from said first spindle and said second member being mounted to swing from said second spindle.

23. An earth-working tool head as defined in claim 22 wherein said first and second spindles are mounted to be non-rotatable.

24. An earth-working tool head as defined in claim 21 wherein said linkage means includes:
a driver gear fixed to the shaft for rotation with the shaft;
an axle;

a driven gear fixed to said axle to mesh with said drive gear and rotate said axle;

first and second pins mounted to move with said rotation of said axle, offset from the axis of said axle and positioned to move substantially 180° out of phase with each other; and first and second connecting rods, said first connecting rod having an opening to receive said first pin and being mounted to swing from said spindle means with said movement of said first pin, said first earth-working member being fixed to said first connecting rod, said second connecting rod having an opening to receive said second pin and being mounted to swing from said spindle means with said movement of said second pin, said second earth-working member being fixed to said second connecting rod.

25. An earth-working tool head as defined in claim 24 wherein said spindle means includes first and second spindles, said first member and said first connecting rod being mounted to swing from said first spindle and said second member and said second connecting rod being mounted to swing from said second spindle.

26. An earth-working tool head as defined in claim 25 wherein said first and second spindles are mounted to be non-rotatable.

27. An earth-working tool head as defined in claim 20 wherein said first and second members are mounted to swing from said spindle means about an axis of rotation.

28. An earth-working tool head as defined in claim 23 wherein said first and second members are mounted to swing from said spindle about an axis of rotation.

29. A powered earth-working tool for operation by a standing operator, comprising:
a housing having an opening;
a prime mover outside said housing;
a shaft operatively connected to said prime mover for rotation by said prime mover extending into said opening;
spindle means mounted in said housing;
first and second elongated earth-working members mounted to swing from said spindle means for sod cutting and lifting, each having a first elongated portion extending from the vicinity of said housing and a second elongated portion extending inwardly substantially perpendicularly to said first portion and substantially parallel to said spindle means, said inwardly extending portions being separated at their inner ends; and
linkage means in said housing operatively connected to said shaft and to said members to swing each of said members in a pendulum-like oscillation from said spindle means.

30. An earth-working tool as defined in claim 29 wherein said linkage means is operatively connected to swing said first and second members in a pendulum-like oscillation from said spindle means substantially 180° out of phase with one another.

31. A powered earth-working tool for operation by a standing operator, comprising:
a housing having an opening;
a prime mover outside said housing;
a shaft operatively connected to said prime mover for rotation by said prime mover extending into said opening;
spindle means mounted in said housing;
first and second separate elongated earth-working members mounted to swing from said spindle means for trenching, each having a first elongated portion extending from the vicinity of said housing and a second elongated portion angularly disposed with respect to said first portion and having a twisted orientation with respect to said first portion; and
linkage means in said housing operatively connected to said shaft and to said members to swing said first and second members in a pendulum-like oscillation from said spindle means out of phase with one another.

32. An earth-working tool as defined in claim 31 wherein said linkage means is operatively connected to swing said first and second members in a pendulum-like oscillation from said spindle means substantially 180° out of phase with one another.

* * * * *

UNITED STATES PATENT AND TRADEMARK OFFICE
CERTIFICATE OF CORRECTION

PATENT NO. : 4,541,492
DATED : September 17, 1985
INVENTOR(S) : John Motruk

It is certified that error appears in the above-identified patent and that said Letters Patent are hereby corrected as shown below:

Column 8, line 7, delete "exployed" and substitute therefor
--employed--.

Column 10, line 28, in claim 19, delete "9" and substitute
therefor --12--.

Column 11, line 32, in claim 28, delete "spindle" and
substitute therefor --spindles--.

Signed and Sealed this

Eleventh Day of March 1986

[SEAL]

Attest:

DONALD J. QUIGG

Attesting Officer

Commissioner of Patents and Trademarks